United States Patent Office 2,979,538
Patented Apr. 11, 1961

2,979,538

PROPYNYL ESTERS OF DICARBOXYLIC ACIDS FOR STABILIZING HALOGENATED HYDROCARBON

John H. Wotiz, Mentor, Ohio, assignor to Diamond Alkali Company, Cleveland, Ohio, a corporation of Delaware No Drawing. Filed July 21, 1958, Ser. No. 749,650

8 Claims. (Cl. 260—651)

The present invention relates to alpha, omega-polyacetylenic polyesters represented by the structure:

(I)
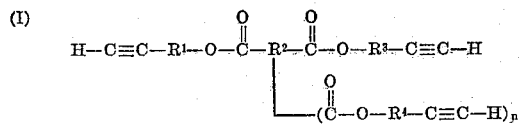

wherein $R^1$, $R^3$, and $R^4$ are divalent hydrocarbon radicals, such as alkylene radicals; $n$ is a number from 0 to 5, inclusive, e.g., 0 to 2; $R^2$ is a polyvalent radical selected from the group consisting of polyvalent hydrocarbon radicals, such as straight chain paraffinic and olefinic radicals, branched chain paraffinic and olefinic radicals, simple cyclic paraffinic and alkyl-substituted cyclic paraffinic radicals, simple cyclic and alkyl-substituted cyclic olefinic radicals, mono-nuclear aromatic and poly-nuclear aromatic carboxylic radicals; and from polyvalent heterocyclic radicals, such as polyvalent heterocyclic radicals, e.g., mono-nuclear and poly-nuclear heterocyclic; straight and branched chain heterocatenary; and substituted derivatives of these compounds, especially halogen and hydroxy substituted derivatives; and to the preparation and application of such compounds.

A preferred type of compound within the scope of this invention comprises alpha, omega-diacetylenic diesters represented by the structure:

(II)
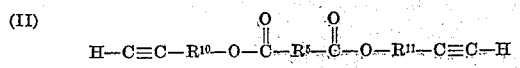

wherein $R^5$, $R^{10}$, and $R^{11}$ are the same or different alkylene radicals, such as methylene, ethylene, propylene, butylene, isopropylene, octylene, and the like, preferably those alkylene radicals containing up to 30 carbon atoms.

More specifically, preferred compounds of this invention are alpha, omega-diacetylenic diesters represented by the structure:

(III)
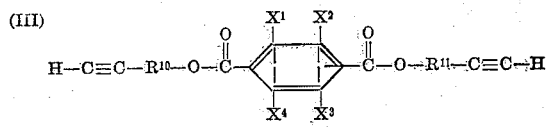

wherein $R^{10}$ and $R^{11}$ are alkylene radicals; and $X^1$, $X^2$, $X^3$, and $X^4$ are selected from the group consisting of halogen, i.e., chlorine, fluorine, bromine, and iodine, chlorine being preferred, and hydrogen atoms.

Preferred compounds within the scope of structure III above are:

Bis(2-propynyl) tetrahaloterephthalate
Bis(2-propynyl) tetrahalosophthalate
Bis(2-propynyl) tetrahalophthalate
Bis(2-propynyl) dihaloterephthalate
Bis(2-propynyl) monohaloterephthalate
Bis(2-propynyl) dihaloisophthalate
Bis(2-propynyl) dichloroisophthalate
Bis(2-propynyl) tetrachloroterephthalate It is known that a chlorinated xylene in a pure condition may be stored or shipped with little or no decomposition induced by exposure to air, light, heat and/or moisture. However, in many instances, obtaining such high purity chlorinated xylene in commercial production is not feasible. It has been found that the chlorinated xylenes normally encountered in commerce specifically chain chlorinated xylenes are subject to some decomposition when in contact with substances such as specks of rust or aluminum, dirt, air, light, heat, moisture and the like and means for preventing and/or inhibiting this decomposition of chlorinated xylenes and/or other chlorinated aromatic hydrocarbons generally associated therewith are highly desirable.

Previously various stabilizers for aliphatic chlorinated hydrocarbons have been employed. Some of these compounds which have demonstrated a degree of effectiveness are acetylenic alcohols, acetylenic ethers, straight chain acetylenic esters, mono-acetylenic hydrocarbons, and mono-acetylenic mono-olefinic hydrocarbons.

Although these prior stabilizers enjoyed a certain amount of success, surprisingly, such materials are not satisfactory for the stabilization of chlorinated xylenes and specifically alpha-chloro-p-xylene for various reasons. Acetylenic alcohols are effective for the stabilization of such chlorinated aliphatic hydrocarbons as perchlorethylene but are ineffective for the stabilization of chlorinated xylenes, i.e., alpha-chloro-p-xylene in that significant decomposition occurs even though the alpha-chloro-p-xylene contains relatively large quantities of these compounds. Mono-acetylenic mono-olefinic hydrocarbons and straight chain acetylenic esters are unsatisfactory for the same reason. It is also significant that bis(2-propynyl) terephthalate is ineffective.

In view of the fact that these compounds employed are unsatisfactory, it would lead to the conclusion that compositions employed in the stabilization of chlorinated xylenes and the method of stabilizing such compounds are highly selective and therefore those stabilizers employed previously in the stabilization of chlorinated hydrocarbons such as carbon tetrachloride, perchlorethylene, tetrachlorethylene, and the like are not adaptable to the stabilization of xylenes.

In general, therefore, the present invention is also directed to a composition comprising essentially a chlorinated aromatic hydrocarbon, e.g., a normally liquid chlorinated xylene, such as alpha-chloro-p-xylene, and a stabilizing amount of alpha, omega-diacetylenic halophthalate such as a bis(2-propynyl) tetrahalophthalate, i.e., bis(2-propynyl) tetrachloroterephthalate; the preferred embodiment being a composition comprising essentially a chlorinated xylene, i.e., alpha-chloro-p-xylene and a stabilizing amount of bis(2-propynyl) tetrachloroterephthalate.

Further the invention is directed to a stabilized composition including an additional ingredient effective to exert a stabilizing action against the influence of light and other sources of decomposition. It will be understood that the invention is not limited to a particular light or other stabilizer and that, in general, any well-known light or other stabilizers may be employed with the general purpose stabilizers of this invention.

As stated a new class of stabilizers noted above namely bis(2-propynyl) tetrahaloterephthalate have been found particularly effective in stabilizing alpha-chloro-p-xylene contaminated with minor amounts of metallic ions such as those produced by specks of rust or aluminum both in liquid and a vapor phase. For the most part the stabilizing effect has been found to be most prolonged where pretreatment which removes the greater part of contaminating metallic ions has been resorted to prior to the addition of stabilizing alpha, omega-diacetylenic ester.

The method of stabilizing the chlorinated aromatic hydrocarbon in accordance with this invention comprises essentially contacting a major proportion of the halogenated aromatic hydrocarbon, i.e., the chlorinated xylene, with a stabilizing amount of the alpha, omega-diacetylenic halophthalate, i.e., bis(2-propynyl) tetrachloroterephthalate. It is preferred that the stabilizer be added after the initial preparation of the chlorinated aromatic hydrocarbon, i.e., after the chlorination step, and that a stabilizing amount of the alpha, omega-diacetylenic diester be combined as noted above, e.g., in an amount of about 0.0001% to 5% by weight of the chlorinated aromatic hydrocarbon, preferably however from about 0.1% to 1% by weight of the chlorinated xylene. Under more adverse conditions such as higher temperatures and/or excessive contamination, it may be necessary to add several percent of the stabilizer. Large quantities of stabilizer are seldom necessary or desirable and, in most cases, amounts of stabilizer less than 5% protect the chlorinated aromatic hydrocarbon against decomposition under the most severe conditions normally encountered. The indicated intermediate preferred range is generally sufficiently effective where the purified chlorinated xylene contains not more than about 0.2% by weight of the metallic impurities most common in commercial production.

Broadly, compounds within the scope of generic structure I above may be prepared by one of four methods. These methods comprise (1) chemically reacting a polycarboxylic acid with a terminal acetylenic alcohol; (2) chemically reacting a terminal acetylenic alcohol with a polycarboxylic acid anhydride; (3) chemically reacting a terminal actylenic alcohol with an alpha, omega lower alkyl polyester; and (4) chemically reacting a terminal acetylenic alcohol with an acid chloride of a polycarboxylic acid. In certain instances, one of the four procedures may be more desirable due, for example to availability of starting materials and the economics of the preparation.

The term "terminal acetylenic alcohol" as employed in the specification and claims is intended to refer broadly to a compound represented by the structure:

(IV) 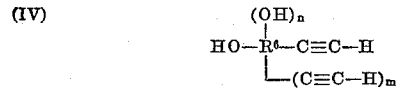

wherein $n$ is a number from 0 to 20, e.g., 0 to 6; $m$ is a number from 0 to 5, i.e., 0 to 3; $R^6$ is a polyvalent hydrocarbon radical, i.e., divalent, preferably an alkylene radical such as methylene, ethylene, propylene, isopropylene, butylene; and substituted derivatives, specifically halogen-substituted derivatives. Especially suitable acetylenic alcohols within the scope of this definition are those wherein $R^6$ is an alkylene radical such as 2-methyl-3-butyn-1-ol; 3-butyn-1-ol, the preferred alcohol within the scope of this class being propargyl alcohol, i.e., 2-propyn-1-ol. Other suitable alcohols within the scope of this definition are set out in the book by A. W. Johnson, The Chemistry of Acetylenic Compounds, vol. 1, "The Acetylenic Alcohols," Edward Arnold & Company, London, 1946, pages 275 through 333. Included terminal acetylenic alcohols are polyolefinic alcohols, such as 3,5,7-decatriene-9-yn-2-ol; mono-olefinic alcohols, such as 3-hexene-5-yn-2-ol; chloro-substituted glycols, such as 5-chloro-3,4-dihydroxy-1-pentyne; and polyhydroxy alcohols, such as 3,4,5-trihydroxy-1-pentyne.

The following polycarboxylic acids are enumerated in order to further illustrate specific acids suitable as starting materials of compounds of this invention and also further to illustrate $R^2$ of structure I above. The known anhydrides, acid chlorides and di lower alkyl esters of these polycarboxylic acids are also specific examples of compounds within the scope of materials which may be chemically reacted with the previously-defined acetylenic alcohols:

(1) Straight chain paraffinic polycarboxylic acids:
  (1) Malonic
  (2) Succinic
  (3) Glutaric
  (4) Adipic
  (5) Pimelic
  (6) Suberic
  (7) Azelaic
  (8) Sebacic
  (9) Brasilic
  (10) Thapsic
  (11) Dodecandioic
(2) Straight chain olefinic polycarboxylic acids:
  (1) Maleic
  (2) Fumaric
  (3) Glutaconic
  (4) Hydromuconic
  (5) Octenedioic
  (6) Heptadienedioic
(3) Branch chain paraffinic polycarboxylic acids:
  (1) Alpha,beta-diethylsuccinic acid
  (2) Octa decylmalonic acid
  (3) 2-ethyl-2-(o-methylphenethyl)-succinic acid
(4) Branch chain olefinic polycarboxylic acids:
  (1) 4-amyl-2,5-heptadienedioic acid
  (2) Itaconic acid
  (3) Methylenemalonic acid
(5) Simple cyclic paraffinic polycarboxylic acids:
  (1) 1,2-cyclohexanedicarboxylic acid
  (2) 1,3-cyclohexanedicarboxylic acid
  (3) 1,4-cyclohexanedicarboxylic acid
  (4) 1,1-cyclohexanedicarboxylic acid
  (5) 1,1-cyclopropanedicarboxylic acid
  (6) 1,2-cyclopropanedicarboxylic acid
  (7) 1,5-cyclooctanedicarboxylic acid
(6) Branched substituted cyclic paraffinic polycarboxylic acids:
  (1) 1-carboxy-2-ethylcyclopentaneacetic acid
  (2) Camphenic acid
  (3) 4-5-[4-(carboxymethyl)-cyclohexyl]pentyl cyclohexanepropionic acid
  (4) 4-tert-butyl-1,2-cyclohexanedicarboxylic acid
  (5) Spiro[3,5]nonane-2,2-dicarboxylic acid
(7) Simple cyclic olefinic polycarboxylic acids:
  (1) 1-cyclohexene-1,2-dicarboxylic acid
  (2) 1,4-cyclohexadiene-1,2-dicarboxylic acid
  (3) Cycloheptatrienedicarboxylic acid
(8) Branched cyclic olefinic polycarboxylic acids:
  (1) 2-(carboxymethylene)-3-methyl - cyclopentanebutyric acid
  (2) 4-vinyl-1-cyclohexene-1,4-dicarboxylic acid
  (3) 6,7,7-trimethylbicyclo[2,2,1]hept-5-ene - 2,3 - dicarboxylic acid
  (4) 1,4,5,6,7,8-hexahydro-6,7-dimethyl-2,3 - naphthalene dicarboxylic acid
(9) Mononuclear aromatic polycarboxylic acids:
  (1) Phthalic acid
  (2) Isophthalic acid
  (3) Terephthalic acid
  (4) Benzenediacetic acid
  (5) Alpha-carboxytoluic acid
(10) Polynuclear aromatic polycarboxylic acids:
  (1) Naphthalenedicarboxylic acid
  (2) 9,10-dihydro-9,10-anthracenedicarboxylic acid
  (3) 1-(1-naphthyl)-2,3-phenanthrenedicarboxylic acid
(11) Mononuclear heterocyclic polycarboxylic acids:
  (1) Piperidine dicarboxylic acid
  (2) Pyrazol dicarboxylic acid
  (3) Thiophene dicarboxylic acid
  (4) Furan dicarboxylic acid
  (5) Dioxane dicarboxylic acid
    A. Substituted derivatives—
      4-carboxy-alpha-chloro-5,5-dimethyl-2 - thiazolidineacetic acid
      3-p-carboxyphenylthio (picolinic acid)
(12) Polynuclear heterocyclic polycarboxylic acids:
  (1) 2-carboxy-3-quinalin acetic acid
  (2) 1-methyl-3,3(4H)-isoquinolin dicarboxylic acid
(13) Straight chain heterocatenary polycarboxylic acids:
  (1) (Ethylenedithio) diacetic acid
  (2) (Ethylimino) diacetic acid
  (3) [Ethylenebis (2-hydroxyethylimino)]diacetic acid
  (4) Imido dicarboxylic acid
  (5) Thiodiacetic acid
  (6) Carbonyldicarbamic acid
(14) Branched chain heterocatenary polycarboxylic acids:
  (1) 4,4,6,6-tetramethyl-5-oxa-4,6-disilanonanedioic acid More specifically, compounds within the scope of this invention may be prepared by chemically reacting a polycarboxylic acid, such as a dicarboxylic acid, of the structure:

(V) 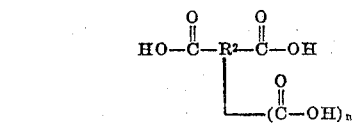

wherein $R^2$ and $n$ are as defined; with a terminal acetylenic alcohol, preferably propargyl alcohol. The above reactants advantageously may be combined in essentially stoichiometric amounts; however, deviations from these amounts may generally be employed without serious detriment to either quality of product or yield. It has been found that in certain instances employment of an excess of alcohol may improve the yield and ease of reaction, e.g., employing 1 mole of acid and from about 1 to 20 moles of alcohol, typically 10 moles of the acetylenic alcohol. The reaction typically requires up to about 48 hours, e.g., 15 to 30 hours.

The reaction being a condensation reaction is complete when the theoretical amount of water is given off or collected. Various means for forcing the reaction to completion may be employed, such as the employment of a hydroscopic agent, e.g., anhydrous copper sulfate; however, the formation of an azeotrope between benzene and water is desirable. Although, in certain instances unnecessary, certain solvents advantageously may be employed to facilitate the reaction, preferably those solvents forming an azeotrope with water, such as hydrocarbons, i.e., benzene, hexane, heptane, and the like, and especially those boiling at a temperature below the boiling point of the acetylenic alcohol employed, such as below 115° C. when propargyl alcohol (B.P. 114°–115° C.) is employed. The reactant mixture comprises essentially up to about 500 ml. of solvent, 200 to 500 mls., 2 moles of the respective acid and 9 to 11 moles of the terminal acetylenic alcohol. A catalyst desirably is employed in the reaction, such as hydrogen chloride or an aromatic sulfonic acid, such as benzene sulfonic acid, toluene sulfonic acid or the like, the catalyst comprising up to about 2% by weight of the reaction mixture, e.g., 0.5% to 1.5% by weight.

The reaction advantageously is carried out at the reflux temperature of the reaction mixture, i.e., at a boiling temperature of the reactants. When the reaction is forced to completion by the collection of water as an azeotrope, typically the reaction temperature is above the boiling point of the respective azeotrope and below the boiling point of the acetylenic alcohol employed, such as up to about 100° C., i.e., 40° to 100° C.

The resultant product may be isolated through methods common in the art, such as recrystallization from an organic solvent or by distillation, preferably at reduced pressure. Suitable solvents which may be employed in the recrystallization are hydrocarbons, such as benzene, hexane and heptane; alcohols, such as methanol, ethanol and propanol, and the like.

In the reaction of a polycarboxylic acid and a terminal acetylenic alcohol, it will be understood that the mono-acetylenic ester represented by the structure:

(VI)

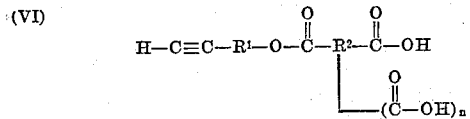

wherein $R^1$, $R^2$ and $n$ are as defined, is formed as an intermediate of the polyacetylenic polyesters. If desired, these intermediates may be formed and recovered as such by adjusting the mole ratio of the reactants and collecting the desired amount of water under essentially the same reaction conditions taught previously.

The preferred chemical reaction within the scope of the above combination of a polycarboxylic acid and the terminal acetylenic alcohol is the method of chemically reacting a dicarboxylic acid of the structure:

(VII)

wherein $R^5$ is an alkylene radical, such as methylene, ethylene, propylene, and the like, with a terminal acetylenic alcohol, e.g., propargyl alcohol. This chemical combination is carried out under essentially the same reaction conditions as those otherwise employed in the reaction of a terminal acetylenic alcohol with a compound of structure V.

Further, compounds within the scope of generic structure I above may be prepared by chemically reacting anhydrides of the structure:

(VIII)

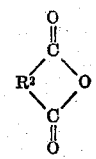

with a terminal acetylenic alcohol; wherein $R^2$ is as defined. These reactants may be combined in essentially the same ratio as that disclosed in the chemical combination of compound V, above, with a terminal acetylenic alcohol.

Although the anhydrides of the specific polycarboxylic acids enumerated previously may be employed in this preparation, specific anhydrides are succinic, glutaric, adipic, pimelic, suberic, azelaic, malonic and glutaconic anhydrides.

The catalyst employed, the respective time of reaction, the solvent employed, the method of causing reaction completion, and the methods of product isolation are essentially the same as those previously disclosed. An excess of the acetylenic alcohol may be used in the chemical combination to form an azeotrope with water, thus eliminating the need of a solvent.

The preferred preparation within the scope of the above chemical combination is the preparation of compounds within the scope of structure II above comprising chemically reacting an anhydride of the structure:

(VIII-A)

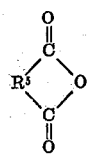

with a terminal acetylenic alcohol, i.e., propargyl alcohol, wherein $R^5$ is an alkylene radical, e.g., lower alkylene.

Still another method of preparing compounds within the scope of generic structure I is the transesterification reaction which comprises essentially chemically reacting a lower alkyl polyester represented by the structure:

(IX)

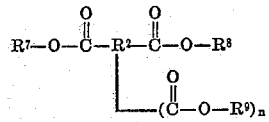

with a terminal acetylenic alcohol wherein $R^7$, $R^8$, and $R^9$ are lower alkyl radicals, e.g., methyl, ethyl, and proply radicals, or the like, and $R^2$ is as previously defined. These reactants may be combined in essentially stoichiometric amounts; however, considerable deviation from these ratios may be employed without serious detriment to either quality of product or yield. In certain instances, an excess of the acetylenic alcohol is desirable, such as chemically reacting 2 moles of the lower alkyl polyester with up to about 15 moles of the acetylenic alcohol, i.e., 5 to 10 moles of acetylenic alcohol. This reaction requires up to about 72 hours, typically ½ to 36 hours, and is facilitated by the use of a catalyst, such as hydrogen chloride or an aryl sulfonic acid, i.e., toluene sulfonic acid.

Although the acetylenic alcohol, such as propargyl alcohol, may be used as the dissolving medium, in certain instances an additional solvent such as a high boiling hydrocarbon, i.e., toluene or xylene, which is inert to the chemical combination may be employed.

Isolation of the resultant product may be carried out through methods common in the art, such as recrystallization from a hydrocarbon solvent, e.g., benzene, hexane, heptane mixture or ether; or, alternatively, through vacuum distillation. The reaction may be carried out at a temperature up to the decomposition temperature of the reactants, such as at the reflux temperature of the reactant mixture, i.e., about 50° to 100° C. employing propargyl alcohol.

Suitable specific lower alkyl diesters within the scope of structure IX above are the methyl or ethyl esters of succinic, glutaric, adipic, pimelic, suberic, azelaic, maleic, and glutaconic acids.

It will be understood, of course, that the alpha monoacetylenic polyester is formed as an intermediate in the preparation of the alpha polyacetylenic polyesters. These compounds may be formed in major proportions by either adjusting the desired mole ratio of the reactants or by collecting the predetermined desired amount of alcohol formed.

Specifically, compounds within the scope of structure II above may be prepared by chemically reacting a compound of the structure:

(IX-A)
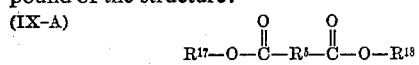

with a terminal acetylenic alcohol, i.e., propargyl alcohol; wherein $R^5$ is an alkylene radical; $R^{17}$ and $R^{18}$ being lower alkyl radicals.

Still another method of preparing compounds within the scope of generic structure I comprises chemically reacting the desired acid halide, preferably acid chloride, represented by the structure:

(X)
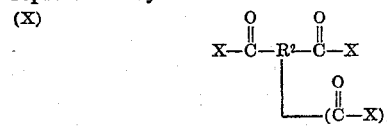

wherein $n$ and $R^2$ are as previously defined, X being halogen, preferably chlorine, with a terminal acetylenic alcohol. These reactants may be combined in essentially stoichiometric ratios; however, in certain instances, an excess of the acetylenic alcohol may be desirable, such as chemically reacting 1 mole of the respective polyacid chloride with 2 to 3.5 moles of the acetylenic alcohol. The chemical combination is typically exothermic and, therefore, proceeds readily without the addition of heat or other activating sources, such as actinic radiation. Although the chemical combination is exothermic, the reactants may be combined at a temperature in the range of up to about the decomposition temperature of the reactants employed, e.g., up to the boiling point of the starting terminal acetylenic alcohol, e.g., 20° C. to 100° C. The chemical reaction may be forced to completion by the isolation of the byproduct, hydrogen halide, e.g., hydrogen chloride, typically through the employment of a neutralizing agent in the reactant system, such as pyridine or a tertiary amine such as trimethyl amine, triethyl amine, and the like, an inorganic neutralizing agent, such as an alkali metal hydroxide or carbonate, e.g., sodium hydroxide, potassium hydroxide, or sodium carbonate in a period of up to about 30 hours. The reaction is complete ordinarily in a period of from about ½ to 4 hours. Typically, the polyacid chlorides are hygroscopic in nature and decompose when in the presence of water; therefore, it is desirable that the reactant system be essentially anhydrous. However, various organic solvents may be employed to facilitate the reaction, such as chlorinated hydrocarbons, e.g., chloroform, carbon tetrachloride, tetrachlorethylene, ethylene dichloride, chlorinated benzene, such as dichlorobenzene and trichlorobenzene, and the like, and hydrocarbons, such as benzene and xylene. Preferably the solvent employed is anhydrous, has a low boiling point, i.e., 35° to 85° C., and is inert to the reactant system.

Typically, the resultant product may be isolated through methods common in the art, such as washing with water, triturating with an organic solvent, such as benzene or xylene, and recrystallizing from an organic solvent, such as a hydrocarbon, e.g., benzene, xylene, or ethers. Typically, the product separates from the reactant system as crystals upon cooling; therefore, distillation is, in certain instances, unnecessary.

Compounds within the scope of structure II above may be prepared by chemically reacting an alpha, omega diacid halide, i.e., chloride of the structure:

(X-A)
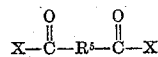

wherein X is a halogen atom, i.e., chlorine; and $R^5$ is an alkylene radical; with a terminal acetylenic alcohol, e.g., propargyl alcohol.

The presently preferred preparation within the scope of the broad hydrogen halide condensation reaction above is the preparation of compounds of structure III which comprises chemically reacting an acid halide of the structure:

(X-B)
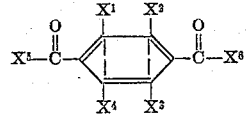

with a terminal acetylenic alcohol, e.g., propargyl alcohol; wherein $X^1$, $X^2$, $X^3$, and $X^4$ are selected from the group consisting of hydrogen and halogen atoms; $X^5$ and $X^6$ are halogen atoms, preferably chlorine atoms. Specific acid halides of structure X–B are terephthalyl chloride, isophthalyl chloride, and phthalyl chloride; halophthalyl chlorides, such as chloroterephthalyl chlorides, i.e., tetrachloroterephthalyl chloride, and chloroisophthalyl chloride, i.e., dichloroisophthalyl chloride.

The compounds of this invention may be employed in a variety of applications, biological or otherwise, such as insecticides, fungicides, herbicides, nematocides; as additives to polymers and halogenated polymers; as stabilizers for halogenated aromatic hydrocarbons, such as chlorinated xylenes; and also as chemical intermediates.

It will be understood, of course, that such compounds may be utilized in diverse formulations, both liquid and solid, including finely-divided powders and granular materials, solutions, concentrates, emulsifiable concentrates, slurries, and the like, depending upon the application intended and the formulation medium desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina-silica materials, and incorporating liquids, solvents, diluents, etc., typically water and various organic liquids such as hydrocarbons, e.g., benzene, toluene, xylenes, chlorinated hydrocarbons, such as chlorinated xylene, chlorinated benzene, chloroform, carbon tetrachloride, and other petroleum distillate fractions or mixtures thereof.

When liquid formulations are employed or dry materials prepared which are to be used in liquid form, it is desirable, in certain instances, to additionally employ a wetting, emulsifying or dispersing agent to facilitate use of the formulation; suitable surface active agents being set out, for example, in an article by John W. McCutcheon in Soap and Chemical Specialties, vol. 31, Nos. 7 through 10 (1955).

The term "carrier" as employed in the specification and claims is intended to refer broadly to the materials constituting a major proportion of a biologically active or other formulations and hence includes finely-divided materials, both liquids and solids as aforementioned conventionally used in such applications.

The compounds of the present invention may also be used alone or in combination with other known biologically active or other materials, such as chlorinated hydrocarbons, organic phosphorous compounds, foliage and soil pesticides, pre- and post-emergent herbicides, and the like.

As previously stated, bis(propynyl) tetrahaloterephthalates are useful as stabilizers of chlorinated aromatic hydrocarbons. In general, it is preferred that a minimum concentration of these compounds be used in the stabilization of the various chlorinated aromatic hydrocarbons, including chlorinated xylenes, the amount required varying with the particular chlorinated aromatic hydrocarbon selected. Broadly, concentrations of about 0.0001% to as high as 10% are effective. With each specific chlorinated aromatic hydrocarbon, the most efficient amount of stabilizer required may readily be determined. In practicing the stabilization employing the compounds of the present invention, the particular chlorinated hydrocarbon desired will determine the specific stabilizer employed, as an example the end use to which the chlorinated hydrocarbons will be put.

In order that those skilled in the art may more completely understand the present invention and the preferred methods by which the same may be carried into effect, the following specific examples are offered.

Example 1

236.2 g. (2.0 mols) succinic acid, 560.5 g. (10.0 mols) of propargyl alcohol, 400 ml. of benzene and 5.0 g. of p-toluene sulfonic acid are mixed in a flask equipped with thermometer, stirrer, reflux condenser, and Dean-Stark water trap. The reaction mixture is heated in a boiling water bath while stirring constantly. The mixture is refluxed for a period of about 24 hours, periodically isolating the water formed. Upon collection of the desired amount of water, the resultant crystals formed in the reaction pot are separated, washed with water and recrystallized from benzene. The remaining mixture is distilled at 122° C. at 2 mm. mercury pressure, the resultant distillation product being recrystallized from benzene, resulting in better than 95% yield of $C_{10}H_{10}O_4$, melting at 33° to 34° C. This product is less than 5% soluble in water and greater than 5% soluble in acetone, cyclohexanone, and xylene, and is further indicated through the following elemental analytical data:

| Element | Actual, Percent by Wgt. | Calculated, Percent by Wgt. |
| --- | --- | --- |
| C | 61.9 | 61.8 |
| H | 5.0 | 5.2 |
| O | 33.3 | 33.0 |

Example 2

Insecticidal utility of the compounds of this invention is shown against the bean aphid, *Aphis fabae*, which is cultured on nasturtium plants. No attempt is made to select insects of a given age in this test. Nasturtium plants are infested with approximately 100 aphids at the time of treatment. The test plants are treated by pouring a formulation (2000 p.p.m., product of Example 1—5% acetone—0.01% Triton X–155—balance water) on the soil at the rate equivalent to 64 lbs./acre. Mortality of better than 45% is observed 24 hours after treatment.

Example 3

Spore germination tests on glass slides are conducted via the test tube dilution method adopted from the procedure recommended by the American Phytopathological Society's committee on standardization of fungicidal tests. In this procedure, the product of Example 1 in aqueous formulations at concentrations of 1000, 100, 10 and 1.0 p.p.m. is tested for its ability to inhibit germination of spores from 7- to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Results indicate that concentrations of less than 1000 p.p.m. afford disease control for both the *A. oleracea* and *M. fructicola*, respectively.

Example 4

Bean, variety Tendergreen, and tomato, variety Bonny Best, plants growing in 4 inch pots are treated by pouring a test formulation (2000 p.p.m., the product of Example 1—5% acetone—0.01% Triton X–155—balance water) into the pots at an equivalent rate of 128 lbs./acre (102 mg./pot). The tomato plants are 3 to 4 inches tall and the trifoliant leaves just starting to unfold at time of treatment. The bean plants are exposed to early blight fungus continuously after seedling emergence so that at the time of treatment infection has occurred. After 10 to 14 days, observation indicates better than 55% disease control by comparison to the control plants.

Example 5

Seeds of perennial rye grass and radish are treated in Petri dishes with aqueous suspensions of the test chemical at 1000 and 100 p.p.m. (1000 and 100 p.p.m., product of Example 1—5% acetone—0.01% Triton X—155—balance water). Lots of 25 seeds of each type are scattered in separate dishes containing filter paper discs moistened with 5 ml. of the test formulation at each concentration. After 7 to 10 days under controlled conditions, the test compound is given a rating which corresponds to the concentration that inhibits germination of half of the seeds in the test or greater. Using this test, the product of Example 1 receives ratings of 100 to 1000 p.p.m. for both the radish and rye grass species.

Example 6

To detect root absorption and translocation, tomato plants, variety Bonny Best, 5 to 7 inches tall, and bean plants, variety Tendergreen, 4 to 6 inches tall, are treated by pouring 51 ml. of a 2000 p.p.m. aqueous test formulation (2000 p.p.m., product of Example 1—5% acetone—0.01% Triton X–155—balance water) onto the soil of 4 inch pots (102 mg./pot or approximately equivalent to 128 lbs./acre) in which the plants are growing. Plants are held under controlled greenhouse conditions for at least 10 days before examination after which phytotoxicity ratings are given based on a scale from 0 for no injury to 11 for plant kill. Using this procedure, the product of Example 1 receives ratings of 4 for the tomato plants and 11 for the bean plants.

Example 7

In order to make an in vitro evaluation of the product of Example 1 as a contact poison, non-plant parasite nematodes, *Panagrellus redivivus*, are exposed to the test chemical in small watch glasses (27 mm. diameter x 8 mm. deep), within a 9 cm. Petri dish. An aqueous test formulation (1000 p.p.m., product of Example 1—5% acetone—0.01% Triton X–155—balance water) is used. Results are recorded 24 hours after treatment and from these it is shown that the test chemical affords 100% mortality at the above concentration.

Example 8

To evaluate the effect of the product of Example 1 upon the germination of seeds in soil, a mixture of seed of six crop plants is broadcast in 8 x 8 x 2 inch metal cake pans filled to within ½ inch of the top with composted greenhouse soil. The seed is uniformly covered with about ¼ inch of soil and watered. After 24 hours, 80 ml. of an aqueous test formulation (160 mg., product of Example 1—5% acetone—0.01% Triton X–155—balance water) is sprayed uniformly over the surface of the pan. This is equivalent to 32 lbs./acre. The seed mixture contains representative of three broadleafs: turnip, flax and alfalfa, and three grasses: wheat, millet, and rye grass. Two weeks after treatment, records are taken on seedling stand as compared to the controls. Using this procedure, results indicate 25% stand for both the broadleaf and grass species.

Example 9

To test phytotoxic effects, tomato plants, variety Bonny Best, 5 to 7 inches tall; corn, variety Cornell M–1 (field corn), 4 to 6 inches tall; beans, variety Tendergreen, just as the trifoliate leaves are beginning to unfold; and oats, variety Clinton, 3 to 5 inches tall, are sprayed with an aqueous test formulation (0.32% product of Example 1—5% acetone—0.01% Triton X–155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure, ratings of 11, 3, 3, and 1, at the above concentrations for the tomato, bean, corn, and oat plants, respectively, are obtained. Results also indicate defoliation of the bean plants.

Example 10

560 g. (10.0 mols) of propargyl alcohol and 5.0 g. of p-toluene sulfonic acid monohydrate catalyst are mixed in a flask equipped with reflux condenser and stirrer. To this mixture, 196 g. (2.0 mols) of maleic anhydride is added slowly with stirring. 350 ml. of benzene is then added and the reaction mixture refluxed with stirring until the desired amount of water is collected in a Dean-Stark receiver, the water being collected as a water-benzene azeotrope. Upon isolation of the desired amount of water, the reaction mixture is cooled, precipitating a portion of the desired product. The benzene is removed from the reaction mixture at reduced pressure, and the remaining mother liquor is distilled at reduced pressure. The resultant product is recrystallized from benzene yielding better than 85% of the desired $C_{10}H_8O_4$, melting at 40° to 41° C. This product is less than 5% soluble in water and greater than 5% soluble in acetone, cyclohexanone and xylene; and is further indicated through the following elemental analytical data:

| Element | Actual, Percent by Wgt. | Calculated, Percent by Wgt. |
|---|---|---|
| C | 62.9 | 62.5 |
| H | 4.2 | 4.2 |

Example 11

Employing the insecticidal evaluation given in Example 2 previously, the product of Example 10, bis(2-propynyl) maleate, causes greater than 95% aphid mortality.

Example 12

Employing the spore germination tests given in Example 3, the product of Example 10 receives a rating of 10 to 100 p.p.m. for both the *A. oleracea* and *M. fructicola*, respectively.

Example 13

In order to evaluate the pre-emergent herbicidal activity of bis(2-propynyl) maleate, a test is carried out whereby seeds of narrow leaf plantain (*Plantago lanceolata*) and perennial rye grass are treated in Petri dishes with aqueous formulations of the product of Example 10, i.e., 1000, 100 and 10 p.p.m., product of Example 10—5% acetone—0.01% Triton X–155—balance water. Lots of 25 seeds of each type are scattered in separate dishes containing filter paper discs moistened with 5 ml. of the test formulation at each concentration. After 7 to 10 days under controlled conditions, the test compound is given a rating which corresponds to the concentration that inhibits germination of half of the seeds (ED 50 value) or greater. Using this test, the product of Example 10 receives ratings of 10 to 100 p.p.m. for both the radish and the plantain plants.

Example 14

To test phytotoxic effects, tomato plants, variety Bonny Best, 5 to 7 inches tall; corn, variety Cornell M–1 (field corn), 4 to 6 inches tall; bean, variety Tendergreen, just as the trifoliate leaves are beginning to unfold; and oats, variety Clinton, 3 to 5 inches tall, are sprayed by an aqueous test formulation (6400 p.p.m. product of Example 10—5% acetone—0.01% Triton X–155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure, results indicate the product of Example 10 receives ratings of 2, 4, 1, and 1, for the tomato, corn, bean, and oat plants, respectively; however, the bean plants are defoliated thus demonstrating selective herbicidal activity.

Example 15

Employing the systemic herbicidal evaluation given in Example 6 previously, the product of Example 10 receives a rating of 9 for the tomato plants; however, the bean plants are completely defoliated thus demonstrating a systemic defoliating action of the product of Example 10.

Example 16

To evaluate the effect of the product of Example 10 upon the germination of seeds in soil, a mixture of seed of six crop plants is broadcast in 8 x 8 x 2 inch metal cake pans filled to within ½ inch of the top with composted greenhouse soil. The seed is uniformly covered with about ¼ inch of soil and watered. After 24 hours, 80 ml. of an aqueous test formulation (160 mg. product of Example 10—5% acetone—0.01% Triton X–155—balance water) is spread uniformly over the surface of the pan. This is equivalent to 32 lbs./acre. The seed mixture contains representatives of three broadleafs: turnip, flax, and alfalfa, and three grasses: wheat, millet, and rye grass. Two weeks after treatment, records are taken on seedling stand as compared to the controls. Using this procedure results show 40% stand for the broadleaf species and 100% stand for the grass species.

Example 17

Employing the non-plant nematocidal evaluation given in Example 7 previously, the product of Example 10 causes 100% nematode control at concentrations of 1000 and 100 p.p.m.

Example 18

Evaluation of the product of Example 10 as a fumigant poison is carried out by exposing non-plant parasite nematodes (*Panagrellus redivivus*), to the test chemical in small watch glasses (27 mm. diameter x 8 mm. deep) within a 9 cm. Petri dish. A test formulation containing 2 mg. of the product of Example 10—5% acetone—0.01% Triton X–155—balance water is used. Observations after 24 hours indicate better than 50% nematode control.

Example 19

320 g. (2.0 mols) of diethyl malonate, 560 g. (10.0 mols) of propargyl alcohol and 5.0 g. of p-toluene sulfonic acid monohydrate are mixed in a flask equipped with reflux condenser, thermometer, stirrer, and heating means. The mixture is refluxed for about 24 hours, i.e., until the desired amount of ethyl alcohol is collected. The solvent and low boiling impurities present in the reactant mixture are removed by distillation at atmospheric pressure and the desired ethyl(2-propynyl)malonate is distilled at 88° to 90° C. at 2.0 mm. mercury pressure. This product is less than 5% soluble in water and greater than 5% soluble in acetone, cyclohexanone and xylene; and is further indicated by the following elemental analytical data:

| Element | Actual, Percent by Wgt. | Calculated, Percent by Wgt. |
|---|---|---|
| H | 5.9 | 5.9 |

This product has a refractive index at 20° C. of 1.4438.

Distillation at reduced pressure is continued separating the desired bis(2-propynyl) malonate at 110° to 115° C. at a 1.8 mm. mercury pressure. The product is recrystallized from a benzene-hexene mixture yielding the desired $C_9H_8O_4$, melting at 36° to 37° C. This product is greater than 5% soluble in acetone, cyclohexanone and xylene, and less than 5% soluble in water; and is further indicated by the following elemental analytical data:

| Element | Actual, Percent by Wgt. | Calculated, Percent by Wgt. |
| --- | --- | --- |
| C | 60.2 | 60.0 |
| H | 4.5 | 4.5 |

Example 20

Employing the insecticidal evaluation given in Example 2 previously, ethyl(2-propynyl) malonate causes 100% mortality at a concentration corresponding to 64 lbs./acre.

Example 21

Employing the fungicidal evaluation given in Example 3 previously, ethyl(2-propynyl) malonate receives ratings of 10 to 100 p.p.m. for the *A. oleracea* and a rating of about 1000 p.p.m. for the *M. fructicola*.

Example 22

Ethyl(2-propynyl) malonate causes better than 50% fungicidal control employing the systemic fungicide test given in Example 4 previously against the early blight fungus.

Example 23

In order to demonstrate herbicidal activity, the test given in Example 13 previously is carried out employing ethyl(2-propynyl) malonate as the test compound. Employing this procedure, the above test chemical receives ratings of 10 to 100 p.p.m. for the plantain species and 100 to 1000 p.p.m. for the rye grass species.

Example 24

In order to further demonstrate herbicidal activity, the systemic evaluation given in Example 6 previously is carried out employing ethyl(2-propynyl) malonate. Results indicate this compound receives a rating of 0 for the tomato plant; however, the bean plants are 100% defoliated.

Example 25

Non-plant parasite nematocidal activity is demonstrated employing the evaluation given in Example 7. Using this test, ethyl(2-propynyl) malonate causes 100% control is at concentration of 100 p.p.m.

Example 26

Fumigant action against non-plant parasite nematodes is demonstrated employing the procedure given in Example 18 previously. Ethyl(2-propynyl) malonate in this test causes 100% nematode control at a concentration of 2 mg.

Example 27

The insecticidal activity of bis(2-propynyl) malonate is illustrated employing the insecticide test given in Example 2. Employing this test at the respective concentration, better than 90% mortality is observed.

Example 28

Fungicidal activity is demonstrated employing the spore examination procedure given in Example 3 previously. Using this procedure bis(2-propynyl) malonate receives ratings of 10 to 100 p.p.m. for the *A. oleracea* and 100 to 1000 p.p.m. for the *M. fructicola*.

Example 29

Pre-emergent herbicidal activity is demonstrated by substituting bis(2-propynyl) malonate in the evaluation given in Example 13 previously. Employing this test, the above chemical receives ratings of 10 to 100 p.p.m. for both the plantain and the rye grass species.

Example 30

Systemic herbicidal activity is demonstrated employing bis(2-propynyl) malonate in the herbicidal evaluation given in Example 6 previously. Using this test, bis(2-propynyl) malonate receives ratings of 11 for both the tomato and bean plants.

Example 31

Further herbicidal activity is demonstrated by substituting bis(2-propynyl) malonate in the evaluation given in Example 16 previously. Employing this procedure, this chemical causes 90% stand for the broadleaf species and 60% stand for the grass species.

Example 32

Non-plant parasite nematocidal activity is demonstrated employing the procedure given in Example 7 previously. Bis(2-propynyl) malonate in this test causes 100% nematode control at a concentration of 1000 p.p.m.

Example 33

280 g. (5.0 mol) of propargyl alcohol and 348 g. of pyridine are mixed in a flask equipped with stirrer, dropping funnel and reflux condenser. 406 g. (2.0 mols) of terephthalyl chloride dissolved in 600 ml. of chloroform is added slowly with stirring to the alcohol pyridine mixture. The reaction is exothermic, and the rate of addition of the acid chloride is regulated to maintain a slow reflux of chloroform. The addition is completed in a period of about 3 to 4 hours, the resultant product precipitating out during the latter part of the chloroform addition. The resultant crystals are triturated with 1 to 2 liters of water, washed with cold water, and dried, yielding better than 85% of $C_{14}H_{10}O_4$, melting at 110° to 111° C. This product is less than 5% soluble in water and xylene, and greater than 5% soluble in acetone and cyclohexanone; and is further indicated by the following elemental analytical data:

| Element | Actual, Percent by Wgt. | Calculated, Percent by Wgt. |
| --- | --- | --- |
| C | 69.2 | 69.4 |
| H | 4.1 | 4.2 |

Example 34

Insecticidal activity of the product of Example 33 is demonstrated employing fourth instar larvae of the Mexican bean beetle, *Epilachna varivestis*, less than one day old within the instar, are employed. Paired seed leaves, excised from Tendergreen bean plants, are dipped in a formulation of the test compound (2000 p.p.m. product of Example 33—5% acetone—0.01% Triton X-155—balance water) until they are thoroughly wetted. The chemical deposit on the leaf is then dried and the paired leaves are separated. Each is placed in a 9 cm. Petri dish with a filter paper lining, and ten randomly selected larvae are introduced before the dish is closed. After three days' exposure better than 50% mortality is observed and moreover better than 50% feeding inhibition is observed.

Example 35

Further insecticidal activity of the product of Example 33 is demonstrated employing male German cockroaches, *Blatella germanica*, 8 to 9 weeks old, are anaesthetized with carbon dioxide to facilitate handling and then dipped in a test formulation (2000 p.p.m. product of Example 33—5% acetone—0.01% Triton X-155—balance water) for 10 seconds, removed, and freed of excess liquid, and caged. Two lots of 10 insects each are exposed to this formulation and mortality observations are recorded after three days. Using the product of Example 33 better than 75% mortality is observed.

*Example 36*

Fungicidal activity of the product of Example 33 is demonstrated employing the spore germination test given in Example 3 previously. Employing this procedure bis(2-propynyl) terephthalate receives ratings of 100 to 1000 p.p.m. for both the *A. oleracea* and *M. fructicola*, respectively.

*Example 37*

Systemic fungicidal action of the product of Example 3 is demonstrated employing the procedure given in Example 4 previously. Bis(2-propynyl) terephthalate in this test causes better than 40% fungicidal control against the early blight fungus.

*Example 38*

Selective herbicidal activity is demonstrated employing the test given in Example 6 previously. In this procedure the product of Example 33 receives ratings of 0 for the tomato plants and 10 for the bean.

*Example 39*

84.0 g. (1.5 mol) of propargyl alcohol, 52.0 g. pyridine and 200 ml. of chloroform are mixed in a flask equipped with Soxhlet extractor and thermometer. 100 g. (0.295 mol) of tetrachloroterephthalyl chloride are placed in the thimble of a Soxhlet extractor and the reaction mixture heated to reflux. The chemical combination proceeds readily over a period of less than 2 hours. Upon reaction completion, the resultant precipitate is separated and recrystallized from chloroform, yielding better than 80% of $C_{14}H_7Cl_4O_4$, melting at 117° to 118° C., and further indicated by the following elemental analytical data:

| Element | Actual, Percent by Wgt. | Calculated, Percent by Wgt. |
|---|---|---|
| C | 44.2 | 44.2 |
| H | 1.6 | 1.6 |
| Cl | 37.5 | 37.3 |

*Example 40*

In order to demonstrate the stabilization effectiveness of the compounds of the present invention, an evaluation procedure is carried out by which alpha-chloro-p-xylene is stabilized with the product of Example 39. In this test 25 ml. of alpha-chloro-p-xylene is placed in each of six 4 ounce clear glass containers. The product of Example 39 is added to the first four containers in amounts of 0.5 g., 0.25 g., 0.12 g., and 0.06 g., respectively. 0.1 g. to 0.5 g. of a metal contaminant comprising 50% iron powder and 50% iron oxide is then added to each of the containers. The latter two containers are used as standard checks. These 6 solutions are allowed to stand at room temperature in the presence of ordinary room light. After a period of 7 days, each solution is rated on a decomposition basis of 0 for colorless and 10 for black solution denoting complete decomposition. Based on this procedure, the above compounds afford complete stabilization for a period of better than 1 week at the lowest concentration employed; whereas the non-stabilized check solution turns black in a period of about 8 hours.

*Example 41*

In order to demonstrate the stabilization effect employing the product of Example 39 against light-catalyzed decomposition, an evaluation procedure is carried out in essentially the same manner as that given in Example 14, but differing in that the iron oxide contaminant is not added. The various solutions are exposed to sunlight by placing in a window for a period of at least 5 days. Observations indicate the addition of the product of Example 39 at the above concentrations afford complete stabilization whereas the standard checks exhibit partial decomposition.

It is to be understood that although the invention has been described with specific reference to particular embodiments thereof, it is not to be so limited since changes and alterations therein may be made which are within the full intended scope of this invention as defined by the appended claims.

What is claimed is:

1. A stabilized side chain-halogenated aromatic hydrocarbon comprising essentially a side chain-halogenated aromatic hydrocarbon contaminated with metal ions and a stabilizing amount of a compound having the structure:

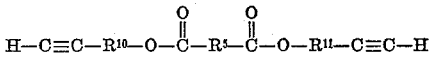

wherein $R^5$, $R^{10}$ and $R^{11}$ are alkylene radicals.

2. A stabilized side chain-halogenated aromatic hydrocarbon comprising essentially a side chain-halogenated aromatic hydrocarbon contaminated with metal ions and a stabilizing amount of a compound having the structure:

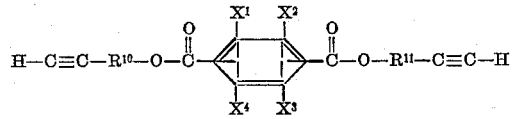

wherein $R^{10}$ and $R^{11}$ are alkylene radicals; and $X^1$, $X^2$, $X^3$ and $X^4$ are selected from the group consisting of halogen and hydrogen atoms, at least one X being halogen.

3. A stabilized side chain, halogenated aromatic hydrocarbon composition comprising essentially a side chain halogenated aromatic hydrocarbon contaminated with metal ions and a stabilizing amount of bis(2-propynyl) tetrachloroterephthalate.

4. The composition according to claim 3 wherein the halogneated aromatic hydrocarbon is a chlorinated methyl benzene.

5. The composition according to claim 3 wherein the halogenated aromatic hydrocarbon is a chloroxylene.

6. The method of stabilizing a side chain halogenated aromatic hydrocarbon contaminated with metal ions which comprises contacting said halogenated aromatic hydrocarbon with a stabilizing amount of bis(2-propynyl) tetrachloroterephthalate.

7. The method according to claim 6 wherein the halogenated aromatic hydrocarbon is a chlorinated methyl benzene.

8. The method according to claim 9 wherein the halogenated aromatic hydrocarbon is alpha-chloro-p-xylene.

References Cited in the file of this patent

UNITED STATES PATENTS

| | | |
|---|---|---|
| 1,097,145 | Snelling | May 19, 1914 |
| 2,221,662 | Rothrock | Nov. 12, 1940 |
| 2,333,666 | Moore et al. | Nov. 9, 1943 |
| 2,340,701 | Schlichting et al. | Feb. 1, 1944 |
| 2,507,509 | Fegley et al. | May 16, 1950 |
| 2,765,224 | Lambrech | Oct. 2, 1956 |
| 2,787,573 | Necomer | Apr. 2, 1957 |
| 2,801,160 | Iserson | July 30, 1957 |
| 2,803,674 | Heiberger et al. | Aug. 20, 1957 |
| 2,805,265 | Heiberger | Sept. 3, 1957 |
| 2,806,873 | Rowlands | Sept. 17, 1957 |